(12) United States Patent
Schupbach et al.

(10) Patent No.: US 9,193,323 B2
(45) Date of Patent: Nov. 24, 2015

(54) AIRBAG COVER DOOR HAVING A VARIABLE LENGTH HINGE

(71) Applicant: Faurecia Interieur Industrie, Nanterre (FR)

(72) Inventors: Thierry Schupbach, St Crepin Ibouvilliers (FR); Franck Edeline, Le Vaumain (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/918,204

(22) Filed: Jun. 14, 2013

(65) Prior Publication Data

US 2014/0151983 A1    Jun. 5, 2014

(30) Foreign Application Priority Data

Jun. 15, 2012 (FR) .................... 12 55625

(51) Int. Cl.
*B60R 21/20* (2011.01)
*B60R 21/215* (2011.01)
*B60R 21/2155* (2011.01)

(52) U.S. Cl.
CPC ........... *B60R 21/215* (2013.01); *B60R 21/2155* (2013.01); *B60R 2021/21537* (2013.01)

(58) Field of Classification Search
CPC ........................................... B60R 2021/21537
See application file for complete search history.

(56) References Cited

U.S. PATENT DOCUMENTS

| 7,178,825 B2* | 2/2007 | Fujii et al. ............ 280/728.3 |
| 2006/0017268 A1* | 1/2006 | Bondoerffer ............ 280/732 |
| 2010/0109296 A1 | 5/2010 | Mazzocchi et al. |

FOREIGN PATENT DOCUMENTS

| DE | 19940984 A1 | 3/2001 |
| EP | 1403148 A2 | 3/2004 |
| EP | 1800971 A1 | 6/2007 |
| EP | 2322390 A1 | 5/2011 |

OTHER PUBLICATIONS

Search Report for French application No. FR 12 55625, dated Jan. 31, 2013, 2 pages.

* cited by examiner

*Primary Examiner* — Keith Frisby
(74) *Attorney, Agent, or Firm* — Reising Ethington P.C.

(57) ABSTRACT

A cover door that includes a frame having a wall and an upper aperture extending at the end of the wall, and a lid covering at least one portion of the upper aperture and movable relatively to the frame so as to clear the upper aperture. The lid is attached to the wall through a hinge-forming area. The hinge-forming area has at least one central hinge connecting a central portion of the lid to the frame, and at least one side hinge connecting a side portion of the lid to the frame. The side hinge has a greater length than the length of the central hinge.

8 Claims, 3 Drawing Sheets

AIRBAG COVER DOOR HAVING A VARIABLE LENGTH HINGE

TECHNICAL FIELD

The present invention relates to a cover door for a vehicle airbag module.

BACKGROUND

One type of known vehicle airbag cover door includes a frame, comprising at least one wall defining a trajectory for deploying the airbag and an upper aperture extending at the end of said wall, and a lid covering at least one portion of the upper aperture and movable relatively to the frame so as to clear the upper aperture and allow deployment of the airbag along the deployment trajectory through the upper aperture, the lid being attached to the wall through an area forming a hinge. Such a cover door is generally obtained by injection molding. Thus the frame and the lid are formed from a same plastic material.

The lid is delimited by a slot by means of which the majority of its perimeter is spaced apart from the internal contour of the frame. The lid is then connected to the frame through only a few connecting points forming a hinge and allowing the opening of the lid in rotation relatively to the frame under the effect of the deployment of the airbag.

Such a device is generally intended to be attached to a plate supporting a trim element of an automobile vehicle. The plate is for example covered with a foam layer, itself covered with a skin in order to form the trim element, such as a dashboard, a door panel or other element and comprises weakened locations allowing a passage to be freed for the airbag during its deployment.

It is known how to produce a continuous hinge extending over the entire length of the lid. However, the forces required for driving the rotation of the lid relatively to the frame are significant and may perturb the deployment of the airbag.

In order to overcome this drawback and to reduce these forces, the hinge may be formed with several portions separated from each other, which facilitates opening of the cover door and increases the deployment velocity of the airbag. However, these different portions are individually more weakened than a continuous hinge of great length. The risks of breaking the hinge during the deployment of the airbag are then increased. This breakage may cause undesirable separation of the lid with respect to the frame.

In order to reduce these risks, the provision of a hinge is known, capable of extending during the rotation of the lid, as described in document EP-1 410 958 for example. Such a hinge for example has an area, the section of which is U-shaped, this U being deployed during the deployment of the airbag so as to extend the hinge.

However, even with such a possibility of elongating the hinge, it may still break. This is particularly true at the side edges of the lid, where the hinge is subject to more stresses during deployment of the airbag. Indeed, during this deployment the lid may tend to deform during its rotation until it causes a larger traction on the side portions of the hinge.

SUMMARY

One of the objects of the invention is to overcome this drawback by proposing a cover door, the behavior of which, during deployment of the airbag, is improved, notably in that the breakage risks of the hinge are reduced.

For this purpose, there is disclosed herein a vehicle airbag cover door of the aforementioned type, in which the area forming a hinge comprises at least one central hinge connecting a central portion of the lid to the frame, and at least one side hinge connecting a side portion of the lid to the frame, the side hinge having a length greater than the length of the central hinge.

By providing a longer side hinge than the central hinge, it is possible to increase the capability of this side hinge of elongating and thus resisting to larger forces exerted on it upon deployment of the airbag. The risks of breaking the hinge upon deployment of the airbag are thereby reduced.

According to other features of the disclosed cover door:
the frame, the lid and the area forming a hinge are made as one single piece;
the frame comprises a portion for attachment to a support, said attachment portion extending around the upper aperture substantially in the plane of said upper aperture and being attached to the wall;
the central hinge, the wall and the attachment portion join up together in a junction area substantially extending in the plane of the upper aperture;
the side hinge, the wall and the attachment portion join up together in a junction area substantially extending in a plane shifted relatively to the plane of the upper aperture, so as to increase the length of the side hinge;
the attachment portion comprises a discontinuity facing the side hinge, said discontinuity substantially extending from the plane of the upper aperture to the junction area of the side hinge for joining to the wall and to the attachment portion, said discontinuity being connected to said junction area;
the central hinge and the side hinge each comprise a frame-joining portion, a deployment portion and a lid-joining portion, the length of the frame-joining portion of the side hinge being greater than the length of the frame-joining portion of the central hinge;
the deployment portions of the central hinge and of the side hinge each have a substantially U-shaped section;
the central hinge and the side hinge are separated from each other by a gap, the lid not being connected to the wall facing this gap;
the wall comprises a thinned area extending facing the gap as far as into the plane of the upper aperture;
the lid is connected to the frame through at least one central hinge and through two side hinges, said side hinges being positioned on either side of said central hinge.

BRIEF DESCRIPTION OF THE DRAWINGS

Other aspects and advantages of the invention will become apparent upon reading the description which follows, given as a example and made with reference to the appended drawings, wherein.

DETAILED DESCRIPTION

Figure 1:
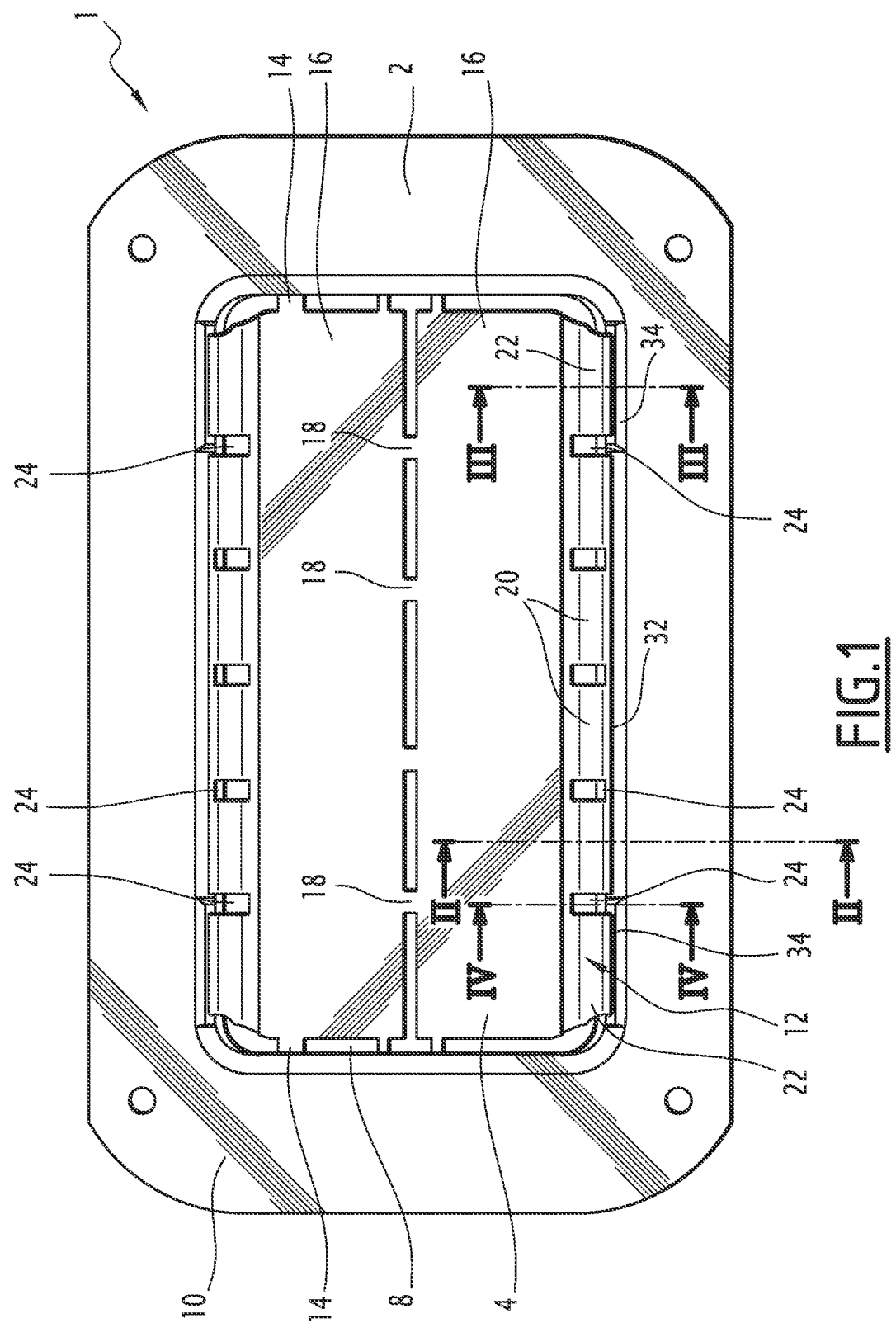
FIG. 1 is a schematic top illustration of an embodiment of an airbag cover door according to the invention.
Figure 2:
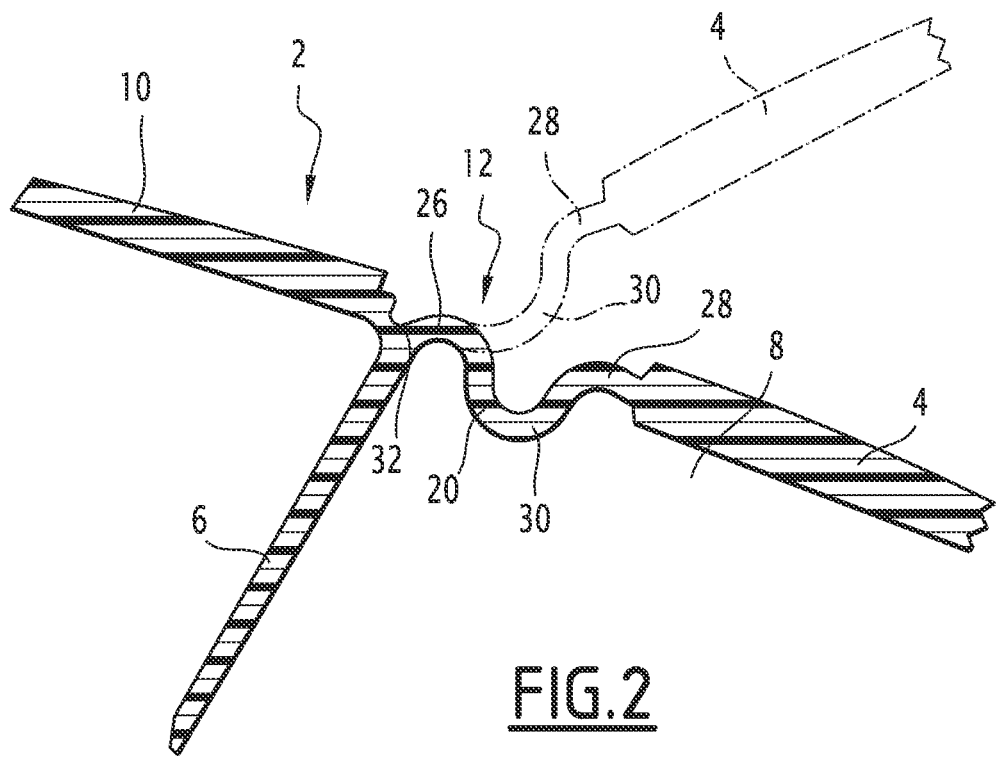
FIG. 2 is a schematic sectional illustration along the axis II-II of FIG. 1.

With reference to FIGS. 1 and 2, a cover door 1 of an airbag is described, comprising a frame 2 and a lid 4. In a known way, such a cover door 1 is for example intended to be attached under a supporting element, of a vehicle trim element, such as a dashboard or a door panel or other element. Insofar that such a trim element and the positioning of the cover door in such a trim element are known, they will not be described in detail herein, only the cover door will be described in detail.

The frame 2 comprises at least one wall 6, defining a trajectory for deployment of the airbag, i.e. forming the "shooting channel" of the airbag. The wall 6 is for example cylindrical with a rectangular, square or trapezoidal section. The wall 6 substantially extends in the deployment direction of the airbag and comprises at its end positioned in the vicinity of the supporting element, an upper aperture 8 extending in a plane substantially perpendicular to the direction in which the wall 6 extends.

The upper aperture 8 is for example intended to be covered with the supporting element of the trim element which, in a known way, comprises weakened locations allowing the supporting element to open in order to free a passage for the airbag towards the outside of the trim element upon its deployment.

The frame 2 further comprises an attachment portion 10 surrounding all or part of the upper aperture 8 and substantially extending in the plane of this upper aperture. The attachment portion 10 is connected to the end of the wall 6 and substantially extends perpendicularly to the latter. The attachment portion 10 allows the cover door 1 to be attached to the supporting element of the trim element and is intended to be attached under this supporting element, around the weakened locations letting passage of the airbag. The attachment portion 10 is for example substantially rectangular, when the wall 6 is cylindrical with a rectangular section.

The lid 4 of the cover door 1 extends in the upper aperture 8 substantially in the plane of the latter so as to at least partly close this aperture 8 when the airbag is folded back. The lid 4 is laid out for exerting a pressure on the supporting element of the trim element and causing its breaking at the weakened locations upon deployment of the airbag. The lid 4 is connected along one of its edges to the wall 6 and to the attachment portion 10 through a hinge-forming area 12 allowing rotation of the lid 4 relatively to the frame 2 upon deployment of the airbag, so that the lid 4 is disengaged from the upper aperture 8 and lets through the airbag, as illustrated in dotted lines in FIG. 2. In the case of a substantially rectangular attachment portion 10 and of a wall 6 of rectangular section, the hinge forming area 12 for example connects the lid 4 to one of the large sides of the rectangle.

According to the embodiment illustrated in FIG. 1, the lid 4 may further be connected to the frame 2 in other points through frangible bridges of material 14, laid out so as to break under the effect of the force exerted by the airbag against the lid 4 upon its deployment. With such bridges of material 14 it is possible to ensure that the lid 4 is maintained in the upper aperture 8 and to avoid the sinking of the lid 4 towards the wall 6, for example if a large pressing force is exerted on the surface of the trim element facing the lid 4.

Also, according to the embodiment illustrated in FIG. 1, the lid 4 is made in two portions 16, connected to each other through frangible bridges of material 18 and each connected to the frame through a hinge-forming area. In this embodiment, the lid opens by rotation along opposite directions of both portions when the airbag presses on the free ends of these portions and breaks the bridges of material 18, substantially in the center of the aperture. The hinge-forming area described below applies both when the lid is connected to the frame through a single hinge-forming area and through two hinge-forming areas, both of these hinge-forming areas being substantially identical.

The frame 2, the lid 4 and the hinge-forming area 12 are made in one single piece for example in plastic material such as an elastomer. According to another embodiment, the frame 2, the lid 4 and the hinge-forming area 12 may be made in two or more than two parts attached to each other, in one or in several different materials.

According to the embodiment illustrated in FIG. 1, the hinge-forming area 12 substantially extends over the whole length of the aperture 8 along one of the substantially rectilinear edges of the lid 4 and of the edge of the facing attachment portion 10. The hinge-forming area 12 is made in several portions, including at least one central hinge portion 20, said central hinge 20, connecting a central portion of the lid 4 to the frame 2, and two side hinge portions 22, so-called side hinges 22, each connecting a side portion of the lid 4 to the frame 2 and being positioned on either side of the central hinge 20. According to the embodiment illustrated in FIG. 1, the hinge-forming area 12 comprises several central hinges 20, the side hinges 22 being each positioned facing one of the central hinges 20 the furthest away from the center of the lid 4. More particularly, the side hinges 22 are each positioned in the vicinity of one of the extreme portions of the length of the aperture 8, i.e. in the vicinity of one of the "corners" of the lid 4 when the aperture 8 is substantially rectangular.

The central hinges 20 and the side hinges 22 are separated from each other by gaps 24 extending from the wall 6 to the lid 4 and for example having a substantially rectangular section. Facing these gaps 24, the lid 4 is not bound to the frame 2. According to the embodiment illustrated in FIG. 1, the gaps 24 are formed by removals of material made in the part forming the hinge area 12, and optionally the frame 2 and the lid 4.

Figure 3:
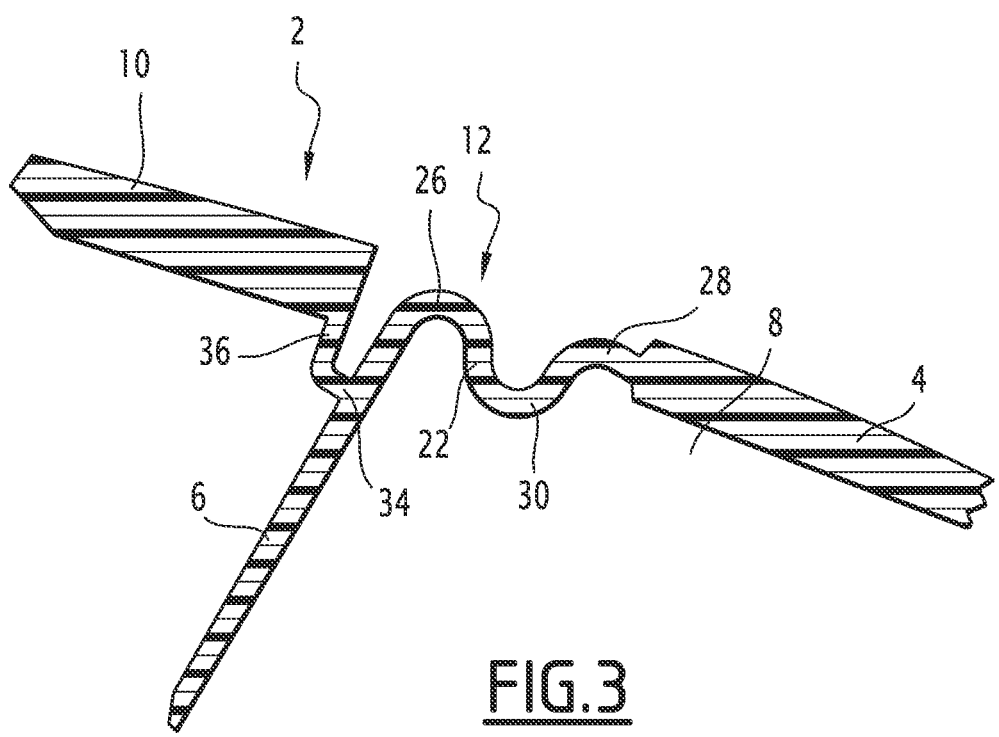
FIG. 3 is a schematic sectional illustration along the axis III-III of FIG. 1.
Figure 4:
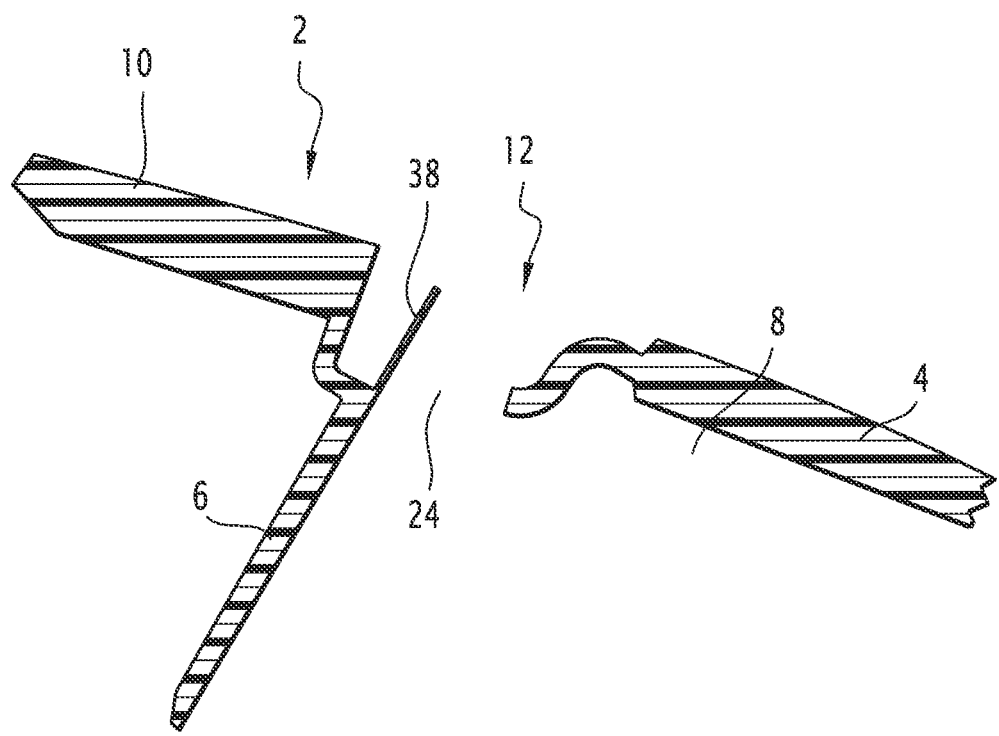
FIG. 4 is a schematic sectional illustration along the axis IV-IV of FIG. 1.

A central hinge 20 is more particularly visible in FIG. 2, a side hinge 22 in FIG. 3 and a gap 24 in FIG. 4.

As illustrated in FIGS. 2 and 3, the central hinge 20 and the side hinges 22 each comprise a frame joining portion 26, connected to the frame 2, a lid joining portion 28, connected to the lid 4, and a deployment portion 30 joining the frame-joining portion 26 to the lid-joining portion 28.

The deployment portion 30 of the central and side hinges has a substantially U-shaped section, i.e. this portion is folded back on itself and is able to extend upon deployment of the airbag by unfolding the deployment portion 30, as illustrated in dotted lines in FIG. 2. In a known way, such unfolding of the deployment portion 30 gives the possibility of limiting the risks of breakage of the lid 4 relatively to the frame 2 upon deployment of the airbag. The deployment portion extends inside the volume defined by the wall 4, i.e. inside the shooting channel.

The frame joining portion 26 of each side hinge 22 has a greater length than the frame joining portion 26 of said or each central hinge 20 so that the overall length of each side hinge 22 is greater than the overall length of said or each central hinge 20, as this may be seen by comparing FIGS. 2 and 3. By providing a greater hinge length for the side hinges 22, it is possible to improve its capability of extending, i.e. the extension length to which the side hinge may be subject, before breaking is increased, and thus improving the general strength of the lid 4 which therefore remains secured to the frame 2 upon deployment of the airbag. The frame-joining portion 26 does not extend inside the volume defined by the wall 6, i.e. it does not extend in the shooting channel. Indeed, the frame-joining portion 26 extends in the continuity of the wall 6 and slightly above the volume defined by the wall 6, as illustrated in FIG. 3.

The frame-joining portion 26 of said or each central hinge 20 is laid out so as to join up with the wall 6 and with the attachment portion 10 in a junction area 32 substantially extending in the plane of the upper aperture 8, as illustrated in FIG. 2. The frame-joining portion 26 of each side hinge 22 is, as for it, laid out so as to join up with the wall 6 and with the attachment portion 10 in a junction area 34 extending in a plane shifted relatively to the plane of the upper aperture 8, as illustrated in FIG. 3.

More particularly, the junction area 34 of the frame joining portion 26 of each side hinge 22 extends under the junction area 32 of the frame joining portion 26 of said or each central hinge 20 so as to extend the length of the frame joining portion 26 of each side hinge 22 relatively to the length of the frame joining portion 26 of said or each central hinge 20. In order to lower the junction area 34 of each other side hinge 22, the attachment portion 10 comprises, facing each side hinge 22, a discontinuity 36 substantially extending perpendicularly to the aperture 8 and connected to the wall 6 at the junction area 34, as illustrated in FIG. 3. The discontinuity 36 therefore substantially extends from the plane of the upper aperture 8 to the junction area 34 of the side hinge 22 and is connected to this junction area 34. Thus, the wall 6 is interrupted at a lower height facing each side hinge 22, relatively to the remainder of the wall 6, the portion extending above the junction area 34 forming the frame-joining portion 26 of each side hinge 22.

The length of the side hinge 22 is increased by increasing the length of its frame-joining portion 26. By increasing the length of the frame 2 joining portion, the bulkiness of each side hinge 22 in the shooting channel is the same as the one of the central hinge(s) 20, which is not bothersome for proper deployment of the airbag. This would not be the case if the length of the side hinge was increased by increasing the length of the deployment portion of the hinge.

In FIG. 4, a gap 24 is illustrated, extending between a central hinge 20 and a side hinge 22. Facing this gap 24, the wall 6 comprises a thinned area 38, with a thickness less than the thickness of the remainder of the wall 6 and extending from the area 34 for joining each side hinge 22 to the frame 2 as far as in the plane of the upper aperture 8, i.e. extending in height between the area 34 for joining each side hinge 22 to the frame 2 and the area 32 for joining the central hinge(s) 20 to the frame 2. This thinned area 38 allows simplification of the injection mold for the cover door 1, when the latter is made in one single piece in plastic material, by limiting the clearance angle at the discontinuity 36 and by thus simplifying the removal of the cover door 1 from the mold.

The cover door 1 described above gives the possibility of improving the robustness of the lid 4 at the hinge-forming area 12 and of thus avoiding a risk of the lid 4 being pulled off from the frame 2. Further, this cover door is simple to make and does not have more significant bulkiness than that of a conventional cover door.

The invention claimed is:

1. A cover door for an airbag module, comprising a frame having at least one wall forming a shooting channel and defining a deployment trajectory of an airbag and an upper aperture extending at the end of said wall, and a lid covering at least one portion of the upper aperture and movable relatively to the frame so as to clear the upper aperture and allow deployment of the airbag along the deployment trajectory through the upper aperture, the lid being attached to the wall through a hinge-forming area, the hinge-forming area comprising at least one central hinge connecting a central portion of the lid to the frame, and at least one side hinge connecting a side portion of the lid to the frame, the side hinge having a greater length than the length of the central hinge, characterized in that the central hinge and the side hinge each comprise a frame joining portion, a deployment portion having a U-shaped section, and a lid-joining portion, the frame-joining portion being a portion of each hinge between one extreme end of the U-shaped section and the frame, the lid-joining portion being a portion of each hinge between the other extreme end of the U-shaped section and the lid, the deployment portion extending inside the shooting channel, and the frame joining portion extending in alignment with the wall and outside the shooting channel, the length of the frame joining portion of the side hinge being greater than the length of the frame-joining portion of the central hinge, the frame comprising an attachment portion for attachment to a support, said attachment portion extending around the upper aperture substantially in the plane of said upper aperture and being attached to the wall, and the side hinge, the wall and the attachment portion joining up in a junction area substantially extending in a plane shifted relatively to the plane of the upper aperture, so as to increase the length of the side hinge relative to the central hinge.

2. The cover door according to claim 1, characterized in that the frame, the lid and the hinge-forming area are made in one single piece.

3. The cover door according to claim 1, characterized in that the central hinge, the wall and the attachment portion join up in a junction area substantially extending in the plane of the upper aperture.

4. The cover door according to claim 1, characterized in that the attachment portion comprises a discontinuity facing the side hinge, said discontinuity substantially extending from the plane of the upper aperture to the area for joining the side hinge to the wall and to the attachment portion, said discontinuity being connected to said junction area.

5. The cover door according to claim 1, characterized in that the central hinge and the side hinge are separated from each other by a gap, the lid not being connected to the wall facing this gap.

6. The cover door according to claim 5, characterized in that the wall comprises a thinned area extending facing the gap as far as in the plane of the upper aperture.

7. The cover door according to claim 1, characterized in that the lid is connected to the frame through at least one central hinge and through two side hinges, said side hinges being positioned on either side of said central hinge.

8. A cover door for an airbag module, comprising:

a frame having at least one wall defining a deployment trajectory of an airbag and forming a shooting channel;

an upper aperture extending at the end of said wall; and a lid covering at least a portion of the upper aperture and movable relative to the frame so as to clear the upper aperture and allow deployment of the airbag along the deployment trajectory through the upper aperture, the lid being attached to the wall through a hinge-forming area, the hinge-forming area comprising at least one central hinge connecting a central portion of the lid to the frame, and at least one side hinge connecting a side portion of the lid to the frame, the side hinge having a greater length than the length of the central hinge, characterized in that the central hinge and the side hinge each comprise a frame-joining portion, a deployment portion having a U-shaped section, and a lid-joining portion, the frame-joining portion being a portion of each hinge between one extreme end of the U-shaped section and the frame, the lid-joining portion being a portion of each hinge between the other extreme end of the U-shaped section and the lid, the deployment portion extending inside the shooting channel, and the frame joining portion extending in the continuity of the wall, the length of the frame joining portion of the side hinge being greater than the length of the frame joining portion of the central hinge, the deployment portion of the central hinge and the deployment portion of the side hinge having the same shape and the same length.

* * * * *